United States Patent
Miyata

(10) Patent No.: US 7,170,619 B2
(45) Date of Patent: Jan. 30, 2007

(54) INFORMATION PROCESSING APPARATUS, PRINTING SYSTEM, AND COMMAND GENERATING METHOD

(75) Inventor: Junichi Miyata, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 963 days.

(21) Appl. No.: 09/951,418

(22) Filed: Sep. 14, 2001

(65) Prior Publication Data

US 2002/0033963 A1    Mar. 21, 2002

(30) Foreign Application Priority Data

Sep. 18, 2000    (JP)    ............... 2000-282450

(51) Int. Cl.
- G06F 1/00    (2006.01)
- G06F 3/00    (2006.01)
- B42C 9/00    (2006.01)
- G03G 15/00   (2006.01)

(52) U.S. Cl. .............. 358/1.15; 715/700; 399/8; 412/1; 412/9; 358/1.13

(58) Field of Classification Search .............. 358/1.15, 358/1.16, 1.11; 412/1, 9; 715/700; 399/8, 399/408

See application file for complete search history.

(56) References Cited

U.S. PATENT DOCUMENTS

| | | | |
|---|---|---|---|
| 5,706,410 A * | 1/1998 | Bagley et al. .............. | 358/1.13 |
| 6,307,637 B1 * | 10/2001 | Kujirai .............. | 358/1.11 |
| 6,476,927 B1 * | 11/2002 | Schwarz, Jr. .............. | 358/1.15 |
| 6,827,514 B1 * | 12/2004 | Shima .............. | 400/582 |

FOREIGN PATENT DOCUMENTS

| | | |
|---|---|---|
| EP | 0 575 172 | 12/1993 |
| EP | 0 820 004 | 1/1998 |
| EP | 1 004 976 A2 | 5/2000 |
| JP | 2000-163225 | 6/2000 |
| KR | 2000-0047731 | 8/2003 |

* cited by examiner

*Primary Examiner*—King Y. Poon
*Assistant Examiner*—Thomas J Lett
(74) *Attorney, Agent, or Firm*—Fitzpatrick, Cella, Harper & Scinto

(57) ABSTRACT

A user sets a desired print function for a printer having a print function. In accordance with the set print function, whether a printer control command recognized by the printer is generated by an application for a host computer or a printer driver is determined. If an additional function of the printer driver, e.g., an N-page print function, a printing/bookbinding function, or the like is set, the printer driver generates a printer control command. If no additional function is set, the application generates a printer control command. The generated printer control command is output from the system spooler of the host computer to the printer.

23 Claims, 13 Drawing Sheets

FIG. 7
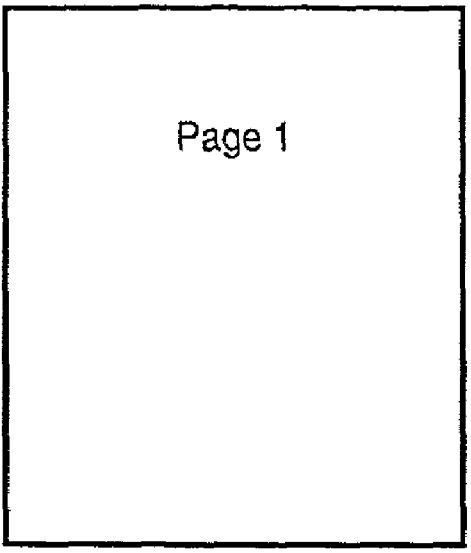
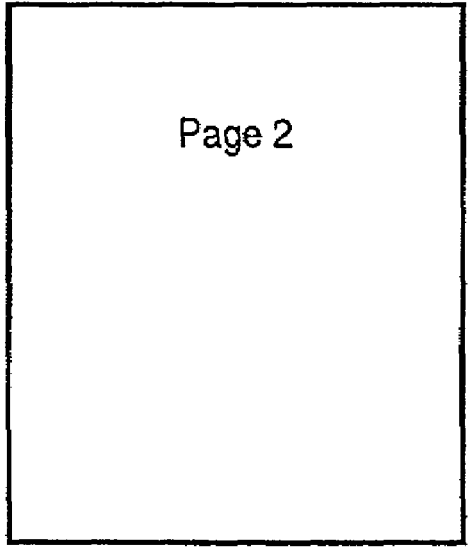

F I G. 8

801

WritePage ( 1 , 10 , 10 , "Page 1" ) :
WritePage ( 2 , 10 , 10 , "Page 2" ) :

```
Page 1 start
0 5    "Page 1"
0 10   "Page 2"
Page 1 end
```

INFORMATION PROCESSING APPARATUS, PRINTING SYSTEM, AND COMMAND GENERATING METHOD

FIELD OF THE INVENTION

The present invention relates to an information processing apparatus which is connected to an output device having a print function and generates an output device control command that can be recognized by the output device, a printing system, and a command generating method.

BACKGROUND OF THE INVENTION

In a printing system that operates on an operating system (OS) such as Microsoft Windows, in general, the graphic engine of the OS converts print data (generally called a GDI (Graphic Device Interface) function) from a print application into a logical print request (generally called a DDI (Device Driver Interface) function) that can be interpreted by a printer driver. This request is transmitted to the printer driver for controlling the printer. The printer driver then interprets the logical print request and generates a printer control command (generally called a page description language (PDL)) that can be recognized by the printer.

As other print sequences, some print applications can autonomously generate printer control commands that can be recognized by printers. More specifically, Adobe-compatible applications such as PageMaker (registered trademark), Photoshop (registered trademark), and CorelDraw' (registered trademark) can issue PS (Postscript) data by their own functions. As described above, in a printing system in which an application can autonomously generate a printer control command, the print application obtains permission from the printer driver to autonomously generate a printer control command, and can directly transmit print data to the printer without the mediacy of most of the function of the printer driver.

In this case, the printer driver can inhibit the generation of a printer control command by the application upon a negotiation with the application. In general, however, when an application autonomously generates a printer control command, a printer control command desired by the application can be generated. This improves the print quality. In addition, since the amount of processing performed by the printer driver decreases, the number of programs (some of a plurality of modules of the printer driver) that operate from the start of printing to the end of printing performed by the application decreases. As a consequence, the print speed increases. For these reasons, conventionally, a printer driver does not inhibit an application from generating a printer control command when the application can generate it, thereby allowing the application to autonomously generate a printer control command and performing printout operation.

In such a conventional printing system including an application capable of generating a printer control command, however, the application autonomously generates a printer control command, and the printer driver transmits printer control language data (PS data) received from the application to the printer. In the printing system, therefore, the application autonomously generates a printer control command, and directly transmits print data to the printer without the mediacy of most of the function of the printer driver. The functions provided by the printer driver include a page layout function executed by an N-page print function, printing/bookbinding function, or the like, and an information adding function of adding a stamp indicating "intra-company secret" or "secret". These functions are transferred to the print data generating module of the printer driver after a print command (DDI function) received through the OS is interpreted by the printer driver to be spooled as intermediate data, and a page layout and information are added to the data. If the data received through the OS is not a print command (DDI function) but is print data (PS data), the printer driver cannot execute a printer driver function such as the N-page print function (the function of printing a plurality of logical pages on one physical page) or the printing/bookbinding function (the function of printing and making a layout for bookbinding). These additional functions cannot be used.

SUMMARY OF THE INVENTION

The present invention has been made to solve the above problem, and has as its object to provide an information processing apparatus, printing system, and command generating method which determine whether an output device control command recognized by an output device is generated by an application or driver, in accordance with a print function set by a user. In doing so the present invention improves print quality and increases print speed.

It is another object of the present invention to selectively give higher priority to a driver additional function or print quality and speed in accordance with a print function.

It is still another object of the present invention to determine a print sequence desired by a user to give higher priority to a driver function or print quality and speed when the user explicitly designates it through a user interface.

In order to achieve the above objects, according to an aspect of the present invention, there is provided an information processing apparatus which is connected to an output device having a print function and generates an output device control command recognized by the output device, comprising: providing means for providing the output device having the print function with a print setting user interface for allowing a user to set a desired print function; determination means for determining, in accordance with the set print function, whether an output device control command recognized by the output device is generated by an application module for designating printing or a driver module for sending out the command to the output device; and output means for outputting the output device control command generated by the determined module.

According to another aspect of the present invention, there is provided a command generating method in an information processing apparatus which is connected to an output device having a print function and generates an output device control command recognized by the output device, comprising: a providing step of providing the output device having the print function with a print setting user interface for allowing a user to set a desired print function; a determination step of determining, in accordance with the set print function, whether an output device control command recognized by the output device is generated by an application module for designating printing or a driver module for sending out the command to the output device; and an output step of outputting the output device control command generated by the determined module.

According to still another aspect of the present invention, there is provided a program for a command generating method in an information processing apparatus which is connected to an output device having a print function and generates an output device control command recognized by the output device, the program causing a computer to implement a function of providing the output device having the print function with a print setting user interface for allowing a user to set a desired print function; a function of determining, in accordance with the set print function, whether an output device control command recognized by the output device is generated by an application module for designating printing or a driver module for sending out the command to the output device; and a function of outputting the output device control command generated by the determined module.

Further objects, features and advantages of the present invention will become apparent from the following detailed description of the embodiments of the present invention with reference to the accompanying drawings.

BRIEF DESCRIPTION OF THE DRAWINGS

FIG. 7 is a view showing 2-page data printed by the user;

FIG. 8 is a view showing a logical print request issued to the graphic engine 202 by the application 201;

FIG. 9 is a view showing an example of a printer control command with a 2-page print function which is generated by the printer driver 203;

DETAILED DESCRIPTION OF THE PREFERRED EMBODIMENTS

Embodiments of the present invention will be described in detail below with reference to the accompanying drawings.

Figure 1:
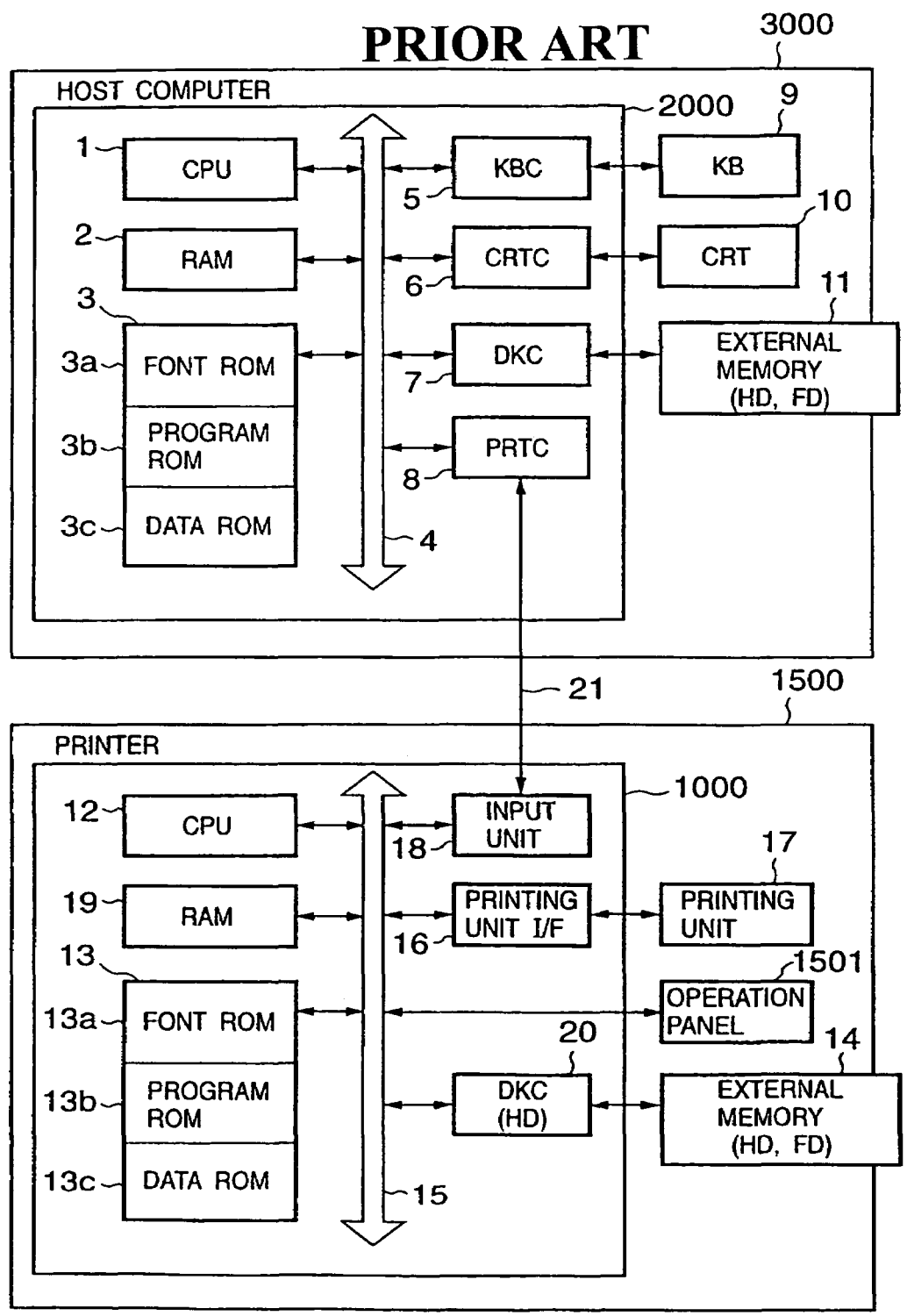
FIG. 1 is a block diagram showing the arrangement of a printing system according to an embodiment.

FIG. 1 is a block diagram showing the arrangement of a printing system according to an embodiment. Obviously, the present invention can be applied to a single device, a system comprised of a plurality of devices, and systems connected to each other through a network such as a LAN or WAN to perform predetermined processing, as long as the function of the present invention can be executed.

Referring to FIG. 1, reference numeral 3000 denotes a host computer having a CPU 1 for executing document processing for a document on which, for example, a graphic pattern, an image, characters, a table (including spreadsheet data or the like), and the like exist at once, on the basis of the document processing program or the like stored in a program ROM 3b of a ROM 3 or an external memory 11. The CPU 1 systematically controls the respective devices connected to a system bus 4.

Note that an operating system program (to be referred to as an OS hereinafter) as a control program for the CPU 1 and the like are stored in the program ROM 3b of the ROM 3 or the external memory 11. Font data and the like used for the above document processing are stored in a font ROM 3a of the ROM 3 or the external memory 11. Likewise, various data used for the above document processing are stored in a data ROM 3c of the ROM 3 or the external memory 11.

Reference numeral 2 denotes a RAM serving as the main memory, work area, and the like of the CPU 1; 5, a keyboard controller (KBC) for controlling key input from a keyboard 9 or a pointing device (not shown); 6, a CRT controller (CRTC) for controlling display on a CRT display (CRT) 10; 7, a disk controller (DKC) for controlling access to the external memory 11 such as a hard disk (HD) or floppy disk (FD) which stores a boot program, various applications, font data, user files, edit files, and the like; and 8, a printer controller (PRTC) which is connected to a printer 1500 through a predetermined two-way interface (interface) 21 and executes communication control processing with the printer 1500.

Note that the CPU 1 rasterizes outline font data on a display information RAM set on the RAM 2 to realize WYSIWYG on the CRT 10. In addition, the CPU 1 opens various registered windows on the basis of the commands designated by the mouse cursor (not shown)on the CRT 10, and executes various data processing. In printing, the user opens a window associated with print settings to set a print processing method for a printer driver, including print settings and selection of a print sequence.

In the printer 1500, a printer CPU 12 systematically controls access to the respective devices connected to a system bus 15 on the basis of the control program or the like stored in a program ROM 13b of a ROM 13 or the control program stored in an external memory 14, and outputs an image signal as output information to a printing unit (printer engine) 17 connected through a printing unit interface (I/F) 16.

A control program or the like for the printer CPU 12 is stored in the program ROM 13b of the ROM 13, and font data or the like used to generate the above output information is stored in a font ROM 13a of the ROM 13. Likewise, information and the like which are to be used on the host computer 3000 when the printer does not have the external memory 14 such as a hard disk are stored in a data ROM 13c of the ROM 13.

The CPU 12 can communicate with the host computer 3000 through an input unit 18, and can notify the host computer 3000 of the information and the like in the printer 1500.

Reference numeral 19 denotes a RAM serving as the main memory, work area, and the like of the CPU 12. The memory capacity can be increased by an option RAM connected to an expansion port (not shown). Note that the RAM 19 is used as an output information rasterization area, environment data storage area, NVRAM, or the like. Access to the external memory 14 such a hard disk (HD) or IC card is controlled by a memory controller (MC) 20. The external memory 14 is connected as an option to store font data, an emulation program, form data, and the like. Reference numeral 1501 denotes an operation panel on which various switches for operation, LED display units, and the like are arranged.

Note that the number of external memories described above is not limited to one; at least one external memory may be prepared. That is, an option font card, in addition to stored font data, and a plurality of external memories storing programs for interpreting different printer control languages may be connected to the printer. Furthermore, the printer may have an NVRAM (not shown) to store printer mode setting information from the operation panel 1501.

Figure 2:
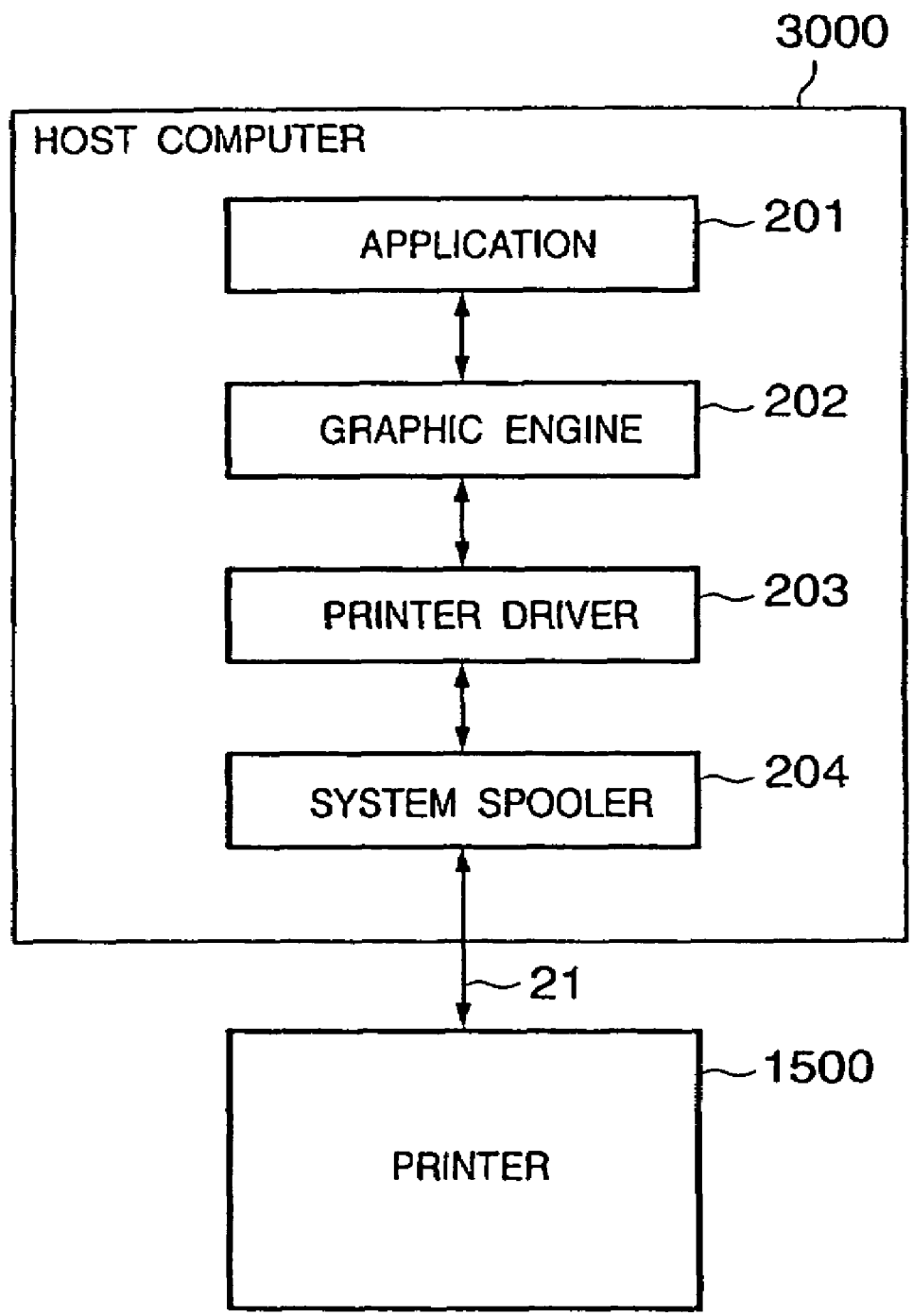
FIG. 2 is a view showing the arrangement of a program module for executing typical print processing in a host computer.

FIG. 2 is a view showing the arrangement of a program module for executing typical print processing in a host computer to which a printing apparatus such as a printer is connected directly or through a network. In this arrangement, an application 201, graphic engine 202, printer driver 203, and system spooler 204 exist as files stored in the external memory 11, which are program modules to be loaded into the RAM 2 by the OS or another module using its module when executed. Note that the application 201 and printer driver 203 can be additionally stored in an external hard disk (HD) through the FD as the external memory 11, a CD-ROM (not shown), or a network (not shown).

The application 201 stored in the external memory 11 is loaded into the RAM 2 when executed. When the application 201 prints by using the printer 1500, data is output by using the graphic engine 202 that can be similarly loaded into the RAM 2 and executed. The graphic engine 202 is loaded from the external memory 11 into the RAM 2, like the printer driver 203 prepared for each printing apparatus, and converts an output from the application 201 into a control command for the printer by using the printer driver 203. The printer control command generated by the printer driver is output to the printer 1500 through the system spooler 204 loaded into the RAM 2 by the OS and the interface 21.

In contrast to this, some applications can autonomously generate printer control commands. In this case, the printer control command generated by such an application is transmitted to the system spooler 204 upon bypassing most of the processing performed by the graphic engine 202 and printer driver 203. The above applications capable of generating printer control commands include, for example, Adobe-compatible applications such as PageMaker, Photoshop, and CorelDraw and DTP-compatible applications such as QuarkXPress.

Figure 3:
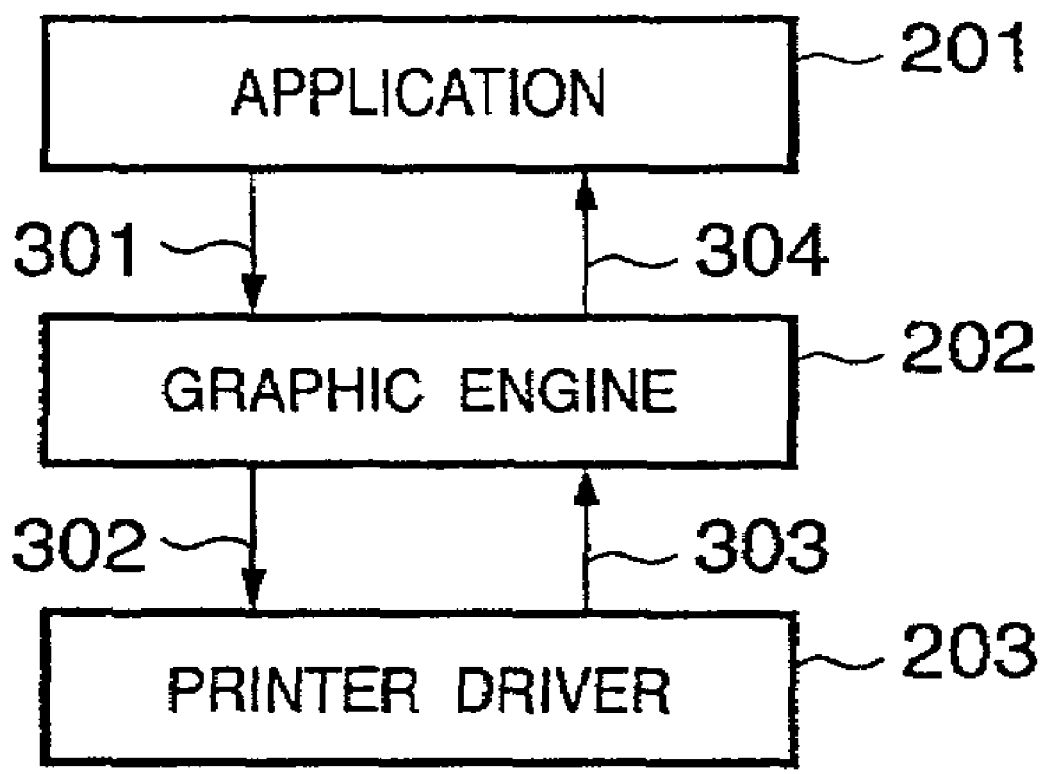
FIG. 3 is a view showing a sequence for determining whether an application autonomously generates a printer control command.

As described above, in a printing system like the one shown in FIG. 2, some applications 201 can autonomously generate printer control commands recognized by the printer 1500. FIG. 3 shows a sequence for making such an application determine whether to autonomously generate a printer control command.

At the start of printing, the application 201 inquires of the graphic engine 202 as to whether it may autonomously generate a printer control command (step 301). The graphic engine 202 makes the same inquiry to the printer driver 203 (step 302). The printer driver 203 gives the graphic engine 202 a response (permission of the generation of a printer control command by the application or inhibition) to the inquiry (step 303). The graphic engine 202 then returns the response received from the printer driver 203 to the application 201.

According to the above sequence, if the received response is "inhibition" indicating the application 201 is not permitted to autonomously generate a printer control command, the application 201 sends a logical print request to the graphic engine 202 at the start of printing. If the received response is "permission" indicating that the application 201 is permitted to autonomously generate a printer control command, the application 201 autonomously generates a printer control command.

Figure 4:
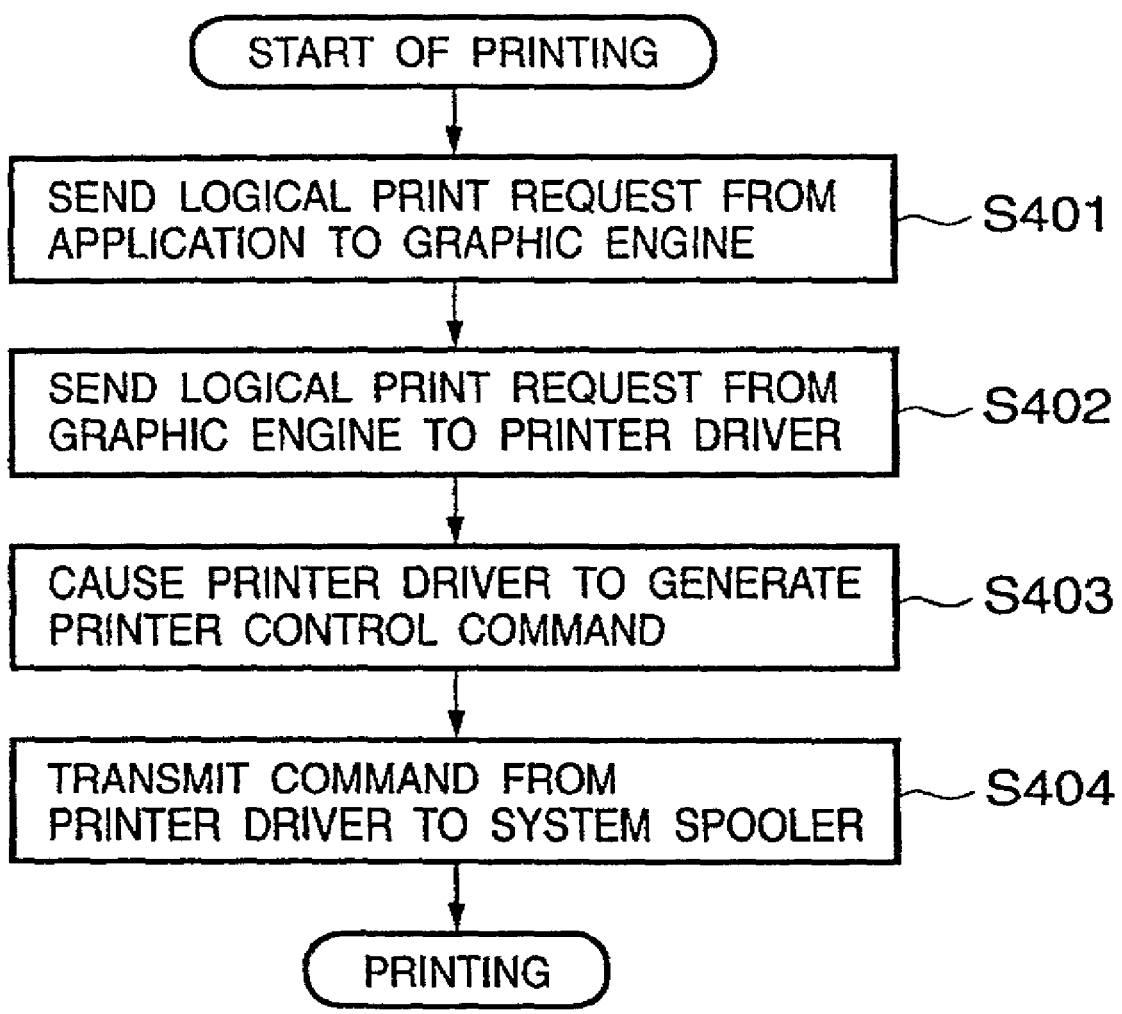
FIG. 4 is a flow chart showing a print sequence for a case where the response received from a printer driver 203 is "inhibition" indicating that the application 201 is not permitted to generate a printer control command.

FIG. 4 shows a print sequence for a case where the response received from the printer driver 203 is "inhibition" indicating that the application 201 is not permitted to generate a printer control command.

First of all, since the application 201 is not permitted to autonomously generate a printer control command at the start of printing, the application 201 sends a logical print request (issuance of a GDI (Graphic Device Interface) function) to the graphic engine 202 (step S401). The graphic engine 202 converts this logical print request into a second logical print request (DDI (Device Driver Interface) function) that can be interpreted by the printer driver, and sends it to the printer driver 203 (step S402). The printer driver 203 interprets this logical print request and converts it into a printer control command that can be recognized by the printer (step S403). The printer driver 203 then transmits this command to the system spooler 204 (step S404). With this operation, the printer control command is transmitted from the system spooler 204 to the printer at a proper timing, thus printing.

Figure 5:
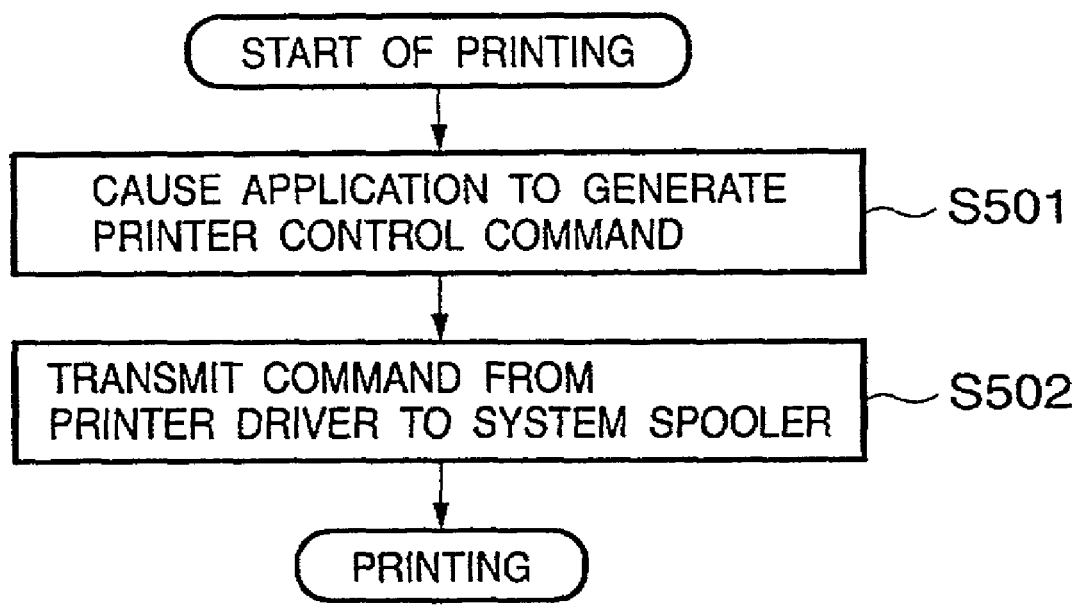
FIG. 5 is a flow chart showing a print sequence for a case where the response received from the printer driver 203 is "permission" indicating that the application 201 is permitted to generate a printer control command.

FIG. 5 shows a print sequence for a case where the response received from the printer driver 203 is "permission" indicating that the application 201 is permitted to autonomously a printer control command.

In this case, at the start of printing, the application 201 recognizes that it can autonomously generate a printer control command, and then autonomously generates a printer control command (step S501). The generated printer control command is directly transmitted to the system spooler 204 by using the graphic engine 202 and only part of the function of the printer driver 203 (the function of transmitting the command received from the application 201 to the system spooler 204) (step S502). More specifically, the application 201 autonomously generates print data (post script code) and transmits it by using a predetermined function, e.g., Escape(PASSTHROUGH). With this operation, the system spooler 204 transmits this print data at a proper timing to print.

In determining a response indicating permission/inhibition of the generation of a printer control command from the printer driver 203, which determines the print sequence in FIG. 3, to the application 201, if, for example, the printer control command that can be generated by the application 201 is identical to the printer control command for the printer managed by the printer driver 203, the printer driver 203 sends the response "permission" indicating that the application 201 can autonomously generate a printer control command. In contrast to this, if the printer control command that can be autonomously generated by the application 201 differs from the printer control command for the printer managed by the printer driver 203, the printer driver 203 sends the response "inhibition" indicating that the application 201 is not permitted to generate a printer control command. The case where the printer control command generated by the printer driver is identical to the printer control command generated by the application corresponds to a case where in a user interface provided by the printer driver and used for print settings, a page layout function and information adding function are not set by the user in print settings (print attributes).

In general, in the printing system including the application 201 that can autonomously generate a printer control command, an improvement in print quality and an increase in print speed can be attained in overall print operation by the print sequence in FIG. 5, in which the application 201 autonomously generates a printer control command to print while omitting most of the functions of the graphic engine 202 and printer driver 203. This is because the application can generate a printer control command including intended fine settings with its own mechanism, and the programs mediating between the start of printing and the end of printing are reduced.

When an application autonomously generates a printer control command, since only some of the functions of the graphic engine and printer driver are associated with printing operation, the use of the additional functions of the printer driver, e.g., the N-page print function and printing/bookbinding function, is limited.

[First Embodiment]

In the first embodiment, priority is selectively given to such print quality/speed or the additional function of the printer driver in accordance with a print function. That is, this embodiment provides a method of determining a portion (application or printer driver) that generates a printer control command on the basis of the print settings made on the user interface of the printer driver by the user, and changing a print sequence.

Control on a print sequence in the first embodiment will be described below.

Figure 6:
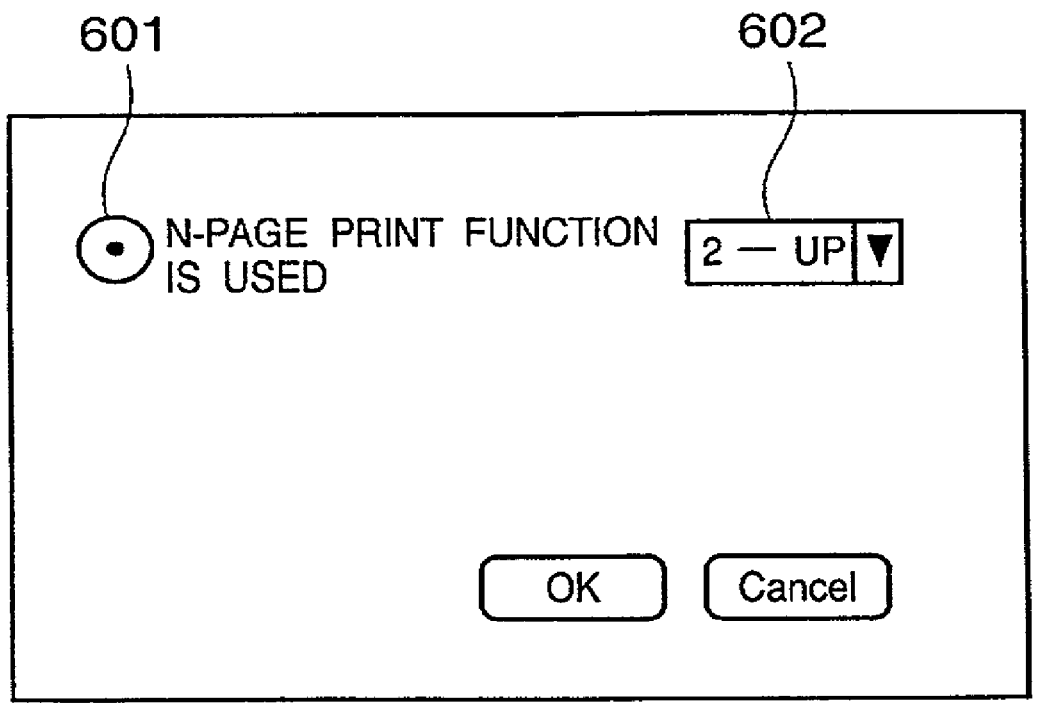
FIG. 6 is a view showing a user interface serving as a print setting window of the printer driver 203.

In preparation for printing, the user makes print setting for a printer driver 203 on the user interface of the printer driver 203 displayed on a CRT 10. For the sake of simplicity, assume that in this embodiment, a user interface like the one shown in FIG. 6 is displayed as the print setting window of the printer driver 203 to make the user set a print function. Referring to FIG. 6, reference numeral 601 denotes a state where the user sets the N-page print function (the function of printing a plurality of logical pages on one physical page) in the ON state; and 602, a state where the user sets 2-page printing (printing two logical pages on one physical page). Assume that in this embodiment, the N-page function is unique to the printer driver 203 and cannot be implemented by the printer control command generated by an application 201. At this time, to implement the N-page print function, the printer driver 203 inhibits the application 201 from autonomously issuing a printer control command. The printer driver 203 then controls the print sequence to autonomously output a printer control command.

Assume that in this case, the user is to print 2-page data like those shown in FIG. 7 by using the application 201.

At the start of printing, the application 201 issues an inquiry to a graphic engine 202 to inquire of the printer driver 203 as to whether the application 201 can autonomously generate a printer control command in the sequence shown in FIG. 3 (step 301). The 202 then sends this inquiry to the graphic engine 202 (step 302). In this case, since the user setting on the user interface indicates the N-page print function using the unique function of the printer driver 203 as shown in FIG. 3, the printer driver 203 returns "inhibition" indicating that the application 201 is inhibited from autonomously generating a printer control command (step 303).

This result is transmitted to the application 201 through the graphic engine 202 (step 304). Upon receiving this response, the application 201 sends a logical print request to the graphic engine 202 without autonomously generating any printer control command. In this embodiment, the print sequence shown in FIG. 4 is therefore executed.

Referring to FIG. 4, after printing is started, the application 201 sends a logical print request to the graphic engine 202 (step S401). FIG. 8 shows an example of the logical print request issued to the graphic engine 202 by the application 201. This logical print request is logical information recognized by the graphic engine 202 and printer driver 203 but is not recognized by the printer. Referring to FIG. 8, reference numeral 801 denotes a case where the character string "Page 1" is printed at coordinates (10, 10) on the first page; and 802, a case where the character string "Page 2" is printed at coordinates (10, 10) on the second page.

Figure 9:
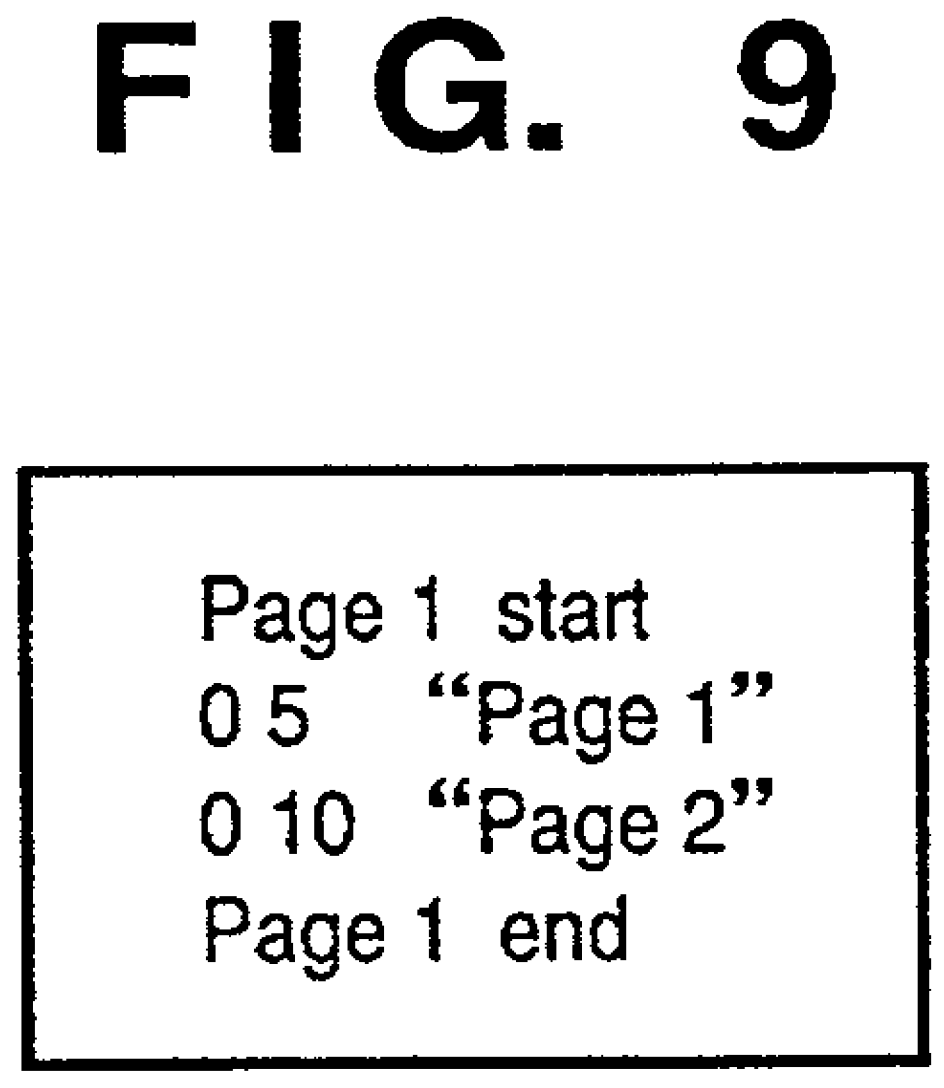
Figure 10:
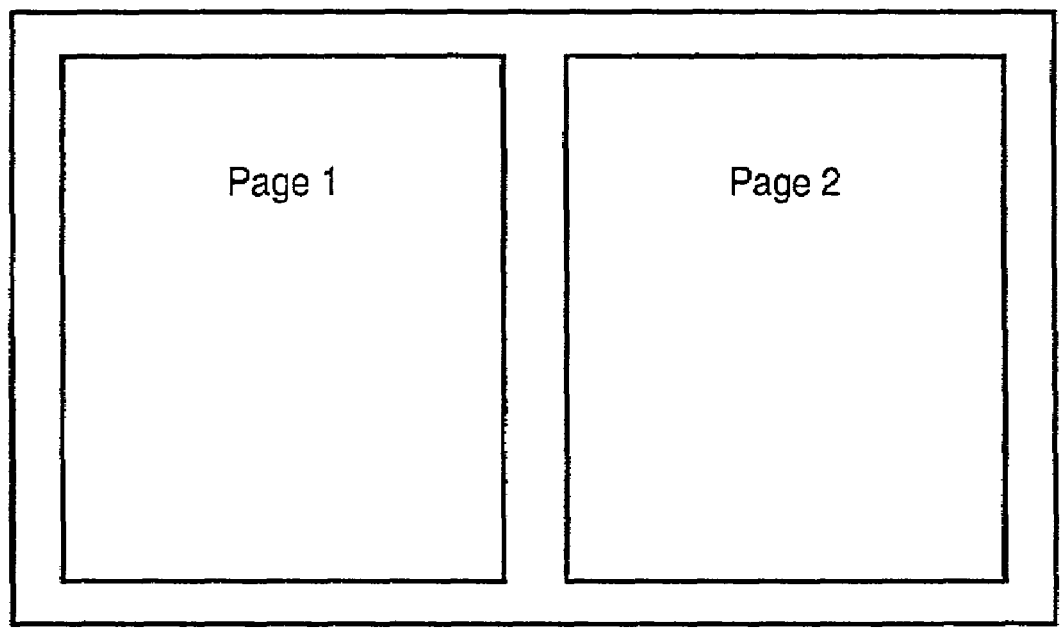
FIG. 10 is a view showing the print result printed by the printer on the basis of 2-page print data.

This logical print request is transferred from the graphic engine 202 to the printer driver 203 (step S402). The printer driver 203 then interprets this logical print request and generates a printer control command designating the N-page print function (step S403). FIG. 9 shows an example of the printer control command designating the 2-page print function generated by the printer driver 203 described above. Note that the printer control command shown in FIG. 9 and generated by the printer driver 203 is 2-page print data that can be recognized by the printer. This data is transmitted to a system spooler 204 (step S404) and printed. FIG. 10 shows the print result printed by the printer on the basis of the 2-page print data.

Figure 11:
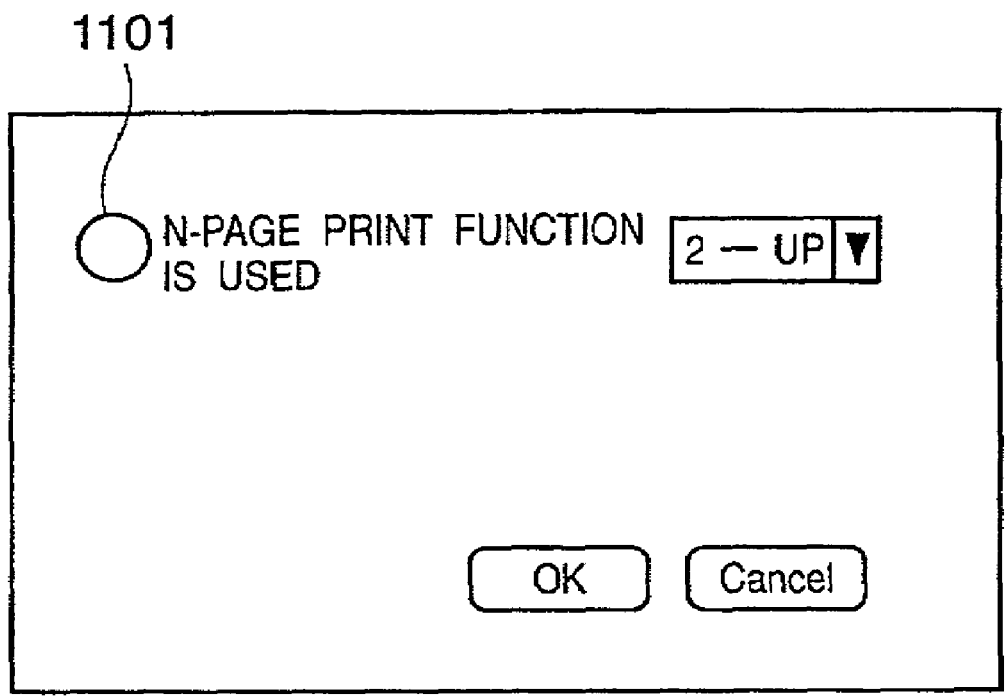
FIG. 11 is a view showing a state where the user sets "N-page print function is used" off.

As denoted by reference numeral 1101 in FIG. 11, when the user sets "N-page print function is used" off, and prints the 2-page data shown in FIG. 7, "permission" indicating that the application 201 is permitted to autonomously generate a printer control command is received in the sequence shown in FIG. 3, and the print sequence shown in FIG. 5 is used until printing is performed.

At the start of printing, the application 201 inquires of the printer driver 203 through the graphic engine 202 as to whether the application 201 can autonomously generate a printer control command (steps 301 and 302). In this case, since the user setting on the user interface indicates that "N-page print function is used" is set in the off state, i.e., the printer driver function is not used, as shown in FIG. 11, the printer driver 203 returns "permission" indicating that the application 201 can autonomously generate a printer control command (step 303).

With this operation, the application 201 receives the above response through the graphic engine 202 (step 304), and autonomously generates a printer control command in accordance with this result (step S501). FIG. 9 shows the printer control command generated by the application 201. The generated command data is transferred to the system spooler 204 by using part of the functions of the graphic engine 202 and printer driver 203 (the function of transferring data to the system spooler 204) (step S502), and is transferred to the printer to perform printing. FIG. 10 shows the print result printed in this manner.

In this embodiment, the printer control command autonomously generated by the application 201 need not be identical to the one generated by the printer driver 203 as shown in FIG. 9 as long as it obtains the same printout as that obtained by the command output from the printer driver 203.

According to the first embodiment, when the user selects the printer driver additional function through the user interface, i.e., the printer control commands that can be generated by the application and printer driver differ from each other, the printer driver automatically generates a printer control command, thereby making the setting made by the user effective.

If the printer driver additional function is not selected by the user, i.e., the printer control commands that can be generated by the application and printer driver are identical, the application generates a printer control command, thereby improving the print quality and increasing the print speed.

[Second Embodiment]

The second embodiment of the present invention will be described next with reference to the accompanying drawings.

In the first embodiment described above, priority is selectively given to the print quality/speed or the additional function of the printer driver in accordance with a print function. In the second embodiment, the user explicitly designates the print quality/speed or the additional function of the printer driver to which higher priority should be given on the user interface of the printer driver.

Control on a print sequence in the second embodiment will be described below.

Figure 12:
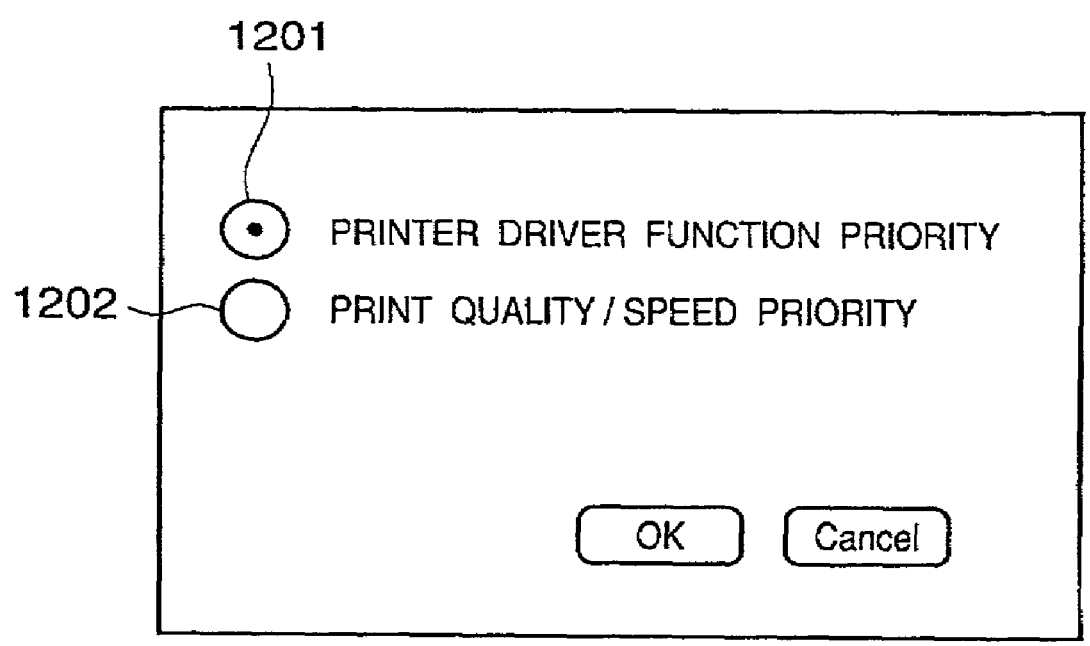
FIG. 12 is a view showing a printer driver function priority setting.

First of all, in preparation for printing, the user designates the print quality/speed or the printer driver function to which higher priority should be given on the user interface of a printer driver 203 which is displayed on a CRT 10. In this embodiment, for the sake of simplicity, assume that a user interface like the one shown in FIG. 12 is displayed as a setting window to allow the user to make a setting to give higher priority to the print quality/speed or the printer driver function. Referring to FIG. 12, reference numeral 1201 denotes a setting "printer driver function priority" indicating that a printer control command is generated by the printer driver 203; and 1202, a setting "print quality/speed priority" indicating that a printer control command is generated by an application 201.

Assume that the user makes a setting as shown in FIG. 12 ("printer driver function priority" is ON). In this case, the printer driver 203 inhibits the application 201 from autonomously issuing a printer control command, and controls the print sequence to generate a printer control command. In this case, as a print sequence from the start of printing to the end of printing, the sequence shown in FIGS. 3 and 4 is used.

At the start of printing, the application 201 inquires of the printer driver 203 through a graphic engine 202 as to whether it can autonomously generate a printer control command (steps 301 and 302), as shown in FIG. 3. As shown in FIG. 12, since the user setting on the user interface indicates that "printer driver function priority" is ON, the printer driver 203 returns "inhibition" indicating that the printer driver 203 generates a printer control command (step 303).

Upon reception of this response through the graphic engine 202 (step 304), the application 201 sends a logical print request to the graphic engine 202 without autonomously generating a printer control command (step S401). The graphic engine 202 transfers this logical print request to the printer driver 203 (step S402). The printer driver 203 then interprets this logical print request and generates a printer control command (step S403). This printer control command is transmitted to a system spooler 204 (step S404), from which the command is transmitted to the printer to perform printing.

Figure 13:
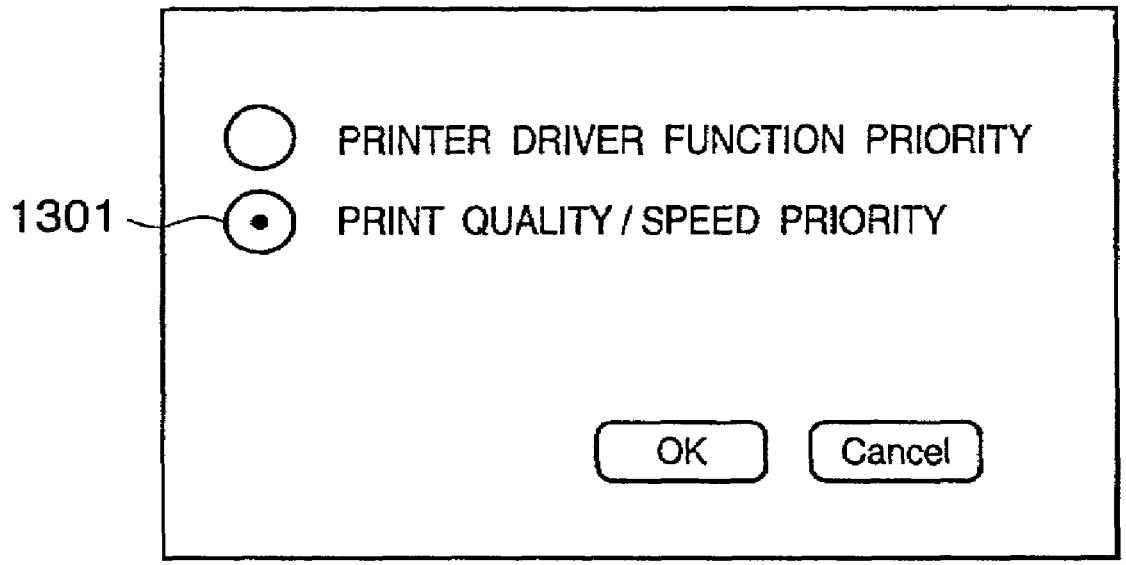
FIG. 13 is a view showing a print quality/speed priority setting.

If the user selects "print quality/speed priority" as denoted by reference numeral 1301 in FIG. 13, as a print sequence from the start of printing to the end of printing, the sequence shown in FIGS. 3 and 5 is used.

At the start of printing, as in the above case, the application 201 inquires of the printer driver 203 through the graphic engine 202 as to whether it can autonomously generate a printer control command (steps 301 and 302). In this case, since the user setting on the user interface indicates "print quality/speed priority" as shown in FIG. 13, the printer driver 203 returns "permission" indicating that the application 201 can autonomously generate a printer control command (step 303).

With this operation, the application 201 receives the above response through the graphic engine 202 (step 304). As a result, the application 201 autonomously generates a printer control command (step S501). In this case, the printer control command data generated by the application 201 is transferred to the system spooler 204 by using part of the functions of the graphic engine 202 and printer driver 203 (the function of transferring data to the system spooler 204) (step S502). This data is then transferred to the printer to be printed.

According to the second embodiment, when the user explicitly designates "printer driver function priority" or "print quality/speed priority" on the user interface, the corresponding print sequence desired by the user can be determined.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or apparatus, and causing the computer (or a CPU or an MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the embodiments, whether an output device control command recognized by an output device is generated by an application or driver is determined in accordance with the print function set by the user. This makes it possible to improve the print quality and increase the print speed.

The present invention has been described above by the preferred embodiments. The present invention is not limited to the above embodiments and various changes and modifications can be made within the spirit and scope of the present invention.

What is claimed is:

1. An information processing apparatus which has an application module having a function for generating a print command capable of being recognized by a printing apparatus that also is capable of recognizing a print command from a printer driver module corresponding to the printing apparatus, comprising:
- input means for inputting a print setting via a print setting user interface to allow a user to set a desired print function;
- determination means for determining, in accordance with the print setting inputted by said input means, which one of the application module and the printer driver module will generate the print command; and
- generating means for generating the print command by using the printer driver module in a case where it is determined by said determination means that the print command is to be generated by the printer driver module, and
- wherein the printer driver module receives the print command generated by the application module and outputs the print command in a case where it is determined by said determination means that the print command is to be generated by the application module.

2. The apparatus according to claim 1, further comprising providing means for providing the printing apparatus having a print function with a print setting user interface for allowing a user to set a desired print function,
- wherein said providing means provides a print setting user interface for setting a print function as an N-page print function or a printing/bookbinding function, and
- wherein said determination means determines that the print command is to be generated by the printer driver module, in a case where the N-page print function or the printing/bookbinding function has been set.

3. The apparatus according to claim 1, wherein said determination means determines that the printer driver module generates the print command, when print commands that can be generated for the print function by the application module and the printer driver module differ from each other.

4. The apparatus according to claim 3, wherein said determination means determines that the printer driver module generates the print command, when at least one of an N-page print function and a printing/bookbinding function is designated.

5. The apparatus according to claim 1, wherein said determination means determines that the application module generates the print command, when print commands that can be generated for the print function by the application module and the printer driver module coincide with each other.

6. The apparatus according to claim 1, wherein said input means inputs instructions that the user explicitly designates a module, which generates the print command, via the print setting user interface.

7. The apparatus according to claim 6, wherein when higher priority is given to print quality and speed as the instructions by said input means, it is determined by said determination means that the print command is generated by the application module.

8. A printing system comprising the information processing apparatus according to claim 1 and an output device having a print function.

9. A command generating method for an information processing apparatus having an application module for generating a print command capable of being recognized by a printing apparatus that also is capable of recognizing a print command from a printer driver module corresponding to the printing apparatus, comprising:
- an input step of inputting a print setting via a print setting user interface to allow a user to set a desired print function;
- a determination step of determining, in accordance with the print setting inputted in the input step, which one of the application module and the printer driver module will generate the print command; and
- a generating step of generating the print command by using the printer driver module in a case where it is determined in the determination step that the print command is to be generated by the printer driver module,
- wherein the printer driver module receives the print command generated by the application module and outputs the print command in a case where it is determined in the determination step that the print command is to be generated by the application module.

10. The method according to claim 9,
- further comprising a providing step of providing the printer apparatus having a print function with a print setting user interface for allowing a user to set a desired print function,
- wherein the providing step provides a print setting user interface for setting a print function as an N-page print function or a printing/bookbinding function, and
- wherein said determination step determines that the print command is to be generated by the printer driver module, in a case where the N-page print function or the printing/bookbinding function has been set.

11. The method according to claim 9, wherein in the determination step, it is determined that the printer driver module generates the print command, when print commands that can be generated for the print function by the application module and the printer driver module differ from each other.

12. The method according to claim 11, wherein in the determination step, it is determined that the printer driver module generates the print command, when at least one of an N-page print function and a printing/bookbinding function is designated.

13. The method according to claim 9, wherein in the determination step, it is determined that the application module generates the print command, when print commands that can be generated for the print function by the application module and the printer driver module coincide with each other.

14. The method according to claim 9, the input step inputs instructions that the user explicitly designates a module, which generates the print command, via the print setting user interface.

15. The method according to claim 14, wherein when, higher priority is given to print quality and speed as instructions in the input step, it is determined in the determination step that the print command is generated by the application module.

16. A computer-executable program, embodied in a computer-readable medium, for a command generating method for an information processing apparatus having an application module for generating a print command to be recognized by a printing apparatus that also is capable of recognizing a print command from a printer driver module corresponding to the printing apparatus, the program causing a computer to implement:
- a function of inputting a print setting via a print setting user interface to allow a user to set a desired print function;
- a function of determining, in accordance with the print setting inputted by the inputting function, which one of the application module and the printer driver module will generate the print command; and a function of generating the print command by using the printer driver module in a case where it is determined that the print command is to be generated by the printer driver module, wherein the printer driver module receives the print command generated by the application module and outputs the print command in a case where it is determined that the print command is to be generated by the application module.

17. The program according to claim 16, further comprising a function of providing the printing apparatus having a print function with a print setting user interface for allowing a user to set a desired print function, wherein the providing function provides a print setting user interface for setting a print function as an N-page print function or a printing/bookbinding function, and wherein it is determined that the print command is to be generated by the printer driver module, in a case where the N-page print function or the printing/bookbinding function has been set.

18. The program according to claim 16, wherein the determining function determines that the printer driver module generates the print command, when print commands that can be generated for the print function by the application module and the printer driver module differ from each other.

19. The program according to claim 18, wherein the determining function determines that the printer driver module generates the print command, when at least one of an N-page print function and a printing/bookbinding function is designated.

20. The program according to claim 16, wherein the determining function determines that the application module generates the print command, when print commands that can be generated for the print function by the application module and the printer driver module coincide with each other.

21. The program according to claim 16, wherein the inputting function inputs instructions that the user explicitly designates a module, which generates the print command, via the print setting user interface.

22. The program according to claim 21, wherein when higher priority is given to print quality and speed as instructions by inputting function, it is determined that the print command is generated by the application module.

23. A computer-readable storage medium storing the program according to claim 16.

* * * * *

UNITED STATES PATENT AND TRADEMARK OFFICE
CERTIFICATE OF CORRECTION

PATENT NO. : 7,170,619 B2  Page 1 of 1
APPLICATION NO. : 09/951418
DATED : January 30, 2007
INVENTOR(S) : Junichi Miyata It is certified that error appears in the above-identified patent and that said Letters Patent is hereby corrected as shown below:

COLUMN 4:
Line 30, "shown)on" should read --shown) on--.
Line 61, "such a" should read --such as a--.

COLUMN 6:
Line 27, "autonomously" should read --autonomously generate--.

COLUMN 7:
Line 52, "The 202" should read --The application 201--.

COLUMN 11:
Line 21, "claim 1, further" should read --claim 1, ¶ further--.

COLUMN 12:
Line 43, "9, the" should read --9, wherein the--.
Line 47, "when," should read --when--.

Signed and Sealed this

Fourth Day of November, 2008

JON W. DUDAS
*Director of the United States Patent and Trademark Office*